Dec. 17, 1968
A. K. LITTWIN
3,417,295
APPARATUS FOR AND METHOD OF MAGNETIZING
CIRCUMFERENTIAL MEMBERS
Filed June 8, 1966
2 Sheets-Sheet 1
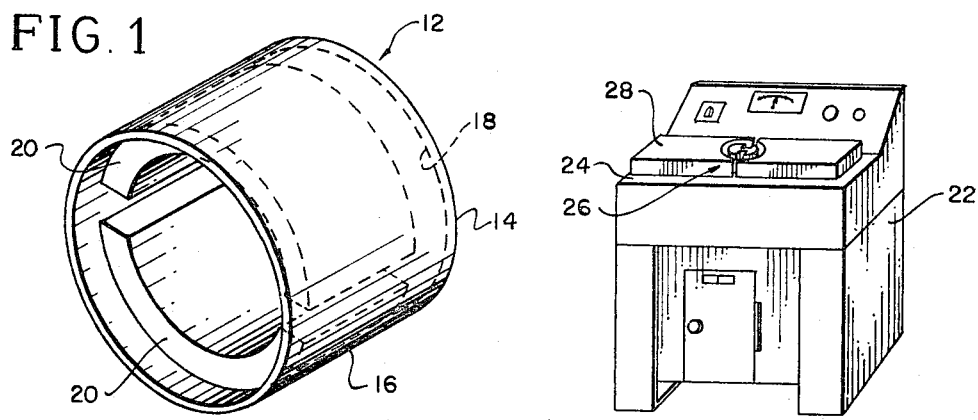
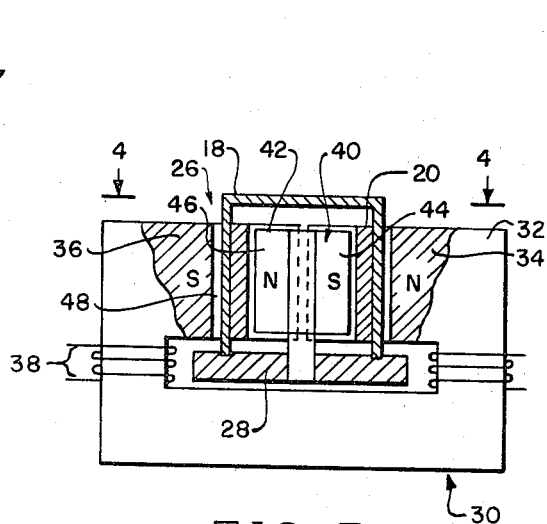
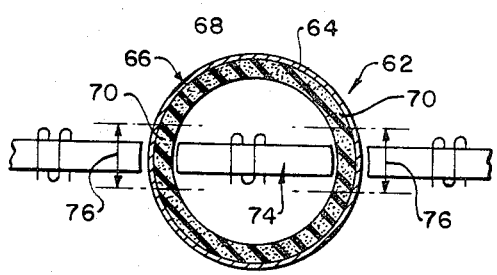
INVENTOR.
ARTHUR K. LITTWIN
BY
Paul H. Gallagher
ATTY.

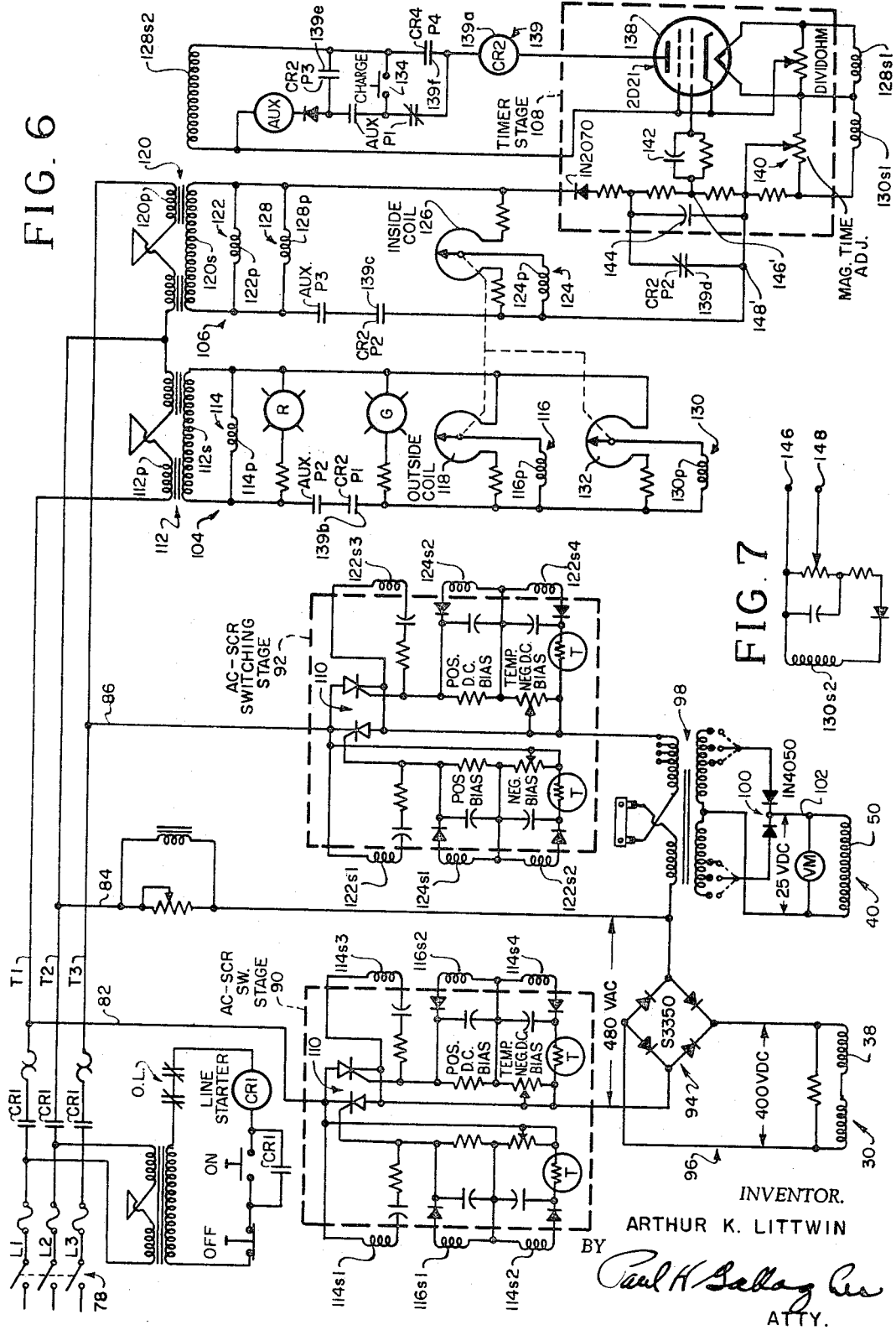
Dec. 17, 1968  A. K. LITTWIN  3,417,295
APPARATUS FOR AND METHOD OF MAGNETIZING
CIRCUMFERENTIAL MEMBERS
Filed June 8, 1966  2 Sheets-Sheet 2
INVENTOR.
ARTHUR K. LITTWIN
BY
Paul H. Gallagher
ATTY.

United States Patent Office 3,417,295
Patented Dec. 17, 1968

3,417,295
APPARATUS FOR AND METHOD OF MAG-
NETIZING CIRCUMFERENTIAL MEMBERS
Arthur K. Littwin, Lincolnwood, Ill., assignor to Arthur
K. Littwin, Robert L. Littwin, Donald F. Littwin and
Horace A. Young, Chicago, Ill., as trustees under trust
dated Jan. 2, 1951, known as Littwin Family Trust
No. 1
Filed June 8, 1966, Ser. No. 556,142
15 Claims. (Cl. 317—123)

ABSTRACT OF THE DISCLOSURE

Magnetizing means including an outer magnet having inwardly directed opposed poles, an inner magnet between said poles and itself having poles opposite to and directed toward the poles of the outer magnet but with gaps between the opposed poles, the gaps receiving elements to be magnetized.

---

The present invention relates to apparatus for and method of magnetizing.

The invention has particular adaptation to magnetizing certain cup type units utilized in generators and motors which includes an outer casing having a surrounding wall and one or more magnets on the inner surface of the wall. The casing, or sometimes other elements, constitutes a continuous magnetic flux path which in the absence of the device of the present invention would form a by-pass, nearly if not entirely, around the magnets with corresponding ineffective magnetizing of the members that later become the magnets.

A broad object of the invention is to provide novel apparatus and method for magnetizing the magnet members in such units to full saturation, quickly and effectively.

Another object is to provide novel means for adjusting the apparatus as to the magnetizing force imposed on the magnet members and corresponding degree of magnetization thereof.

The apparatus and method of the invention utilize both an outer magnetizing head and an inner magnetizing head, relative to the cup shaped unit and the two magnetizing heads together form a flux path directly through the magnet members, eliminating the bypassing path for the flux around the magnet members referred to above.

Still another object is to provide novel means and apparatus for utilizing AC and converting it to DC and utilizing it in a coordinated manner in the two magnetizing heads.

Other objects and advantages of the invention will appear from the following detail description taken in conjunction with the accompanying drawings wherein:

FIGURE 1 is a perspective view of a cup type unit utilized in a generator or motor of the character referred to above and to which the invention is particularly adapted;

FIGURE 2 is a perspective view of a mechanical structure in which the apparatus of the invention is incorporated;

FIGURE 3 is a detail view of the magnetizing station in the device of FIGURE 2 showing an article to be magnetized, and the magnetizing heads;

FIGURE 4 is a view taken at line 4—4 of FIGURE 3;

FIGURE 5 is a view oriented similarly to FIGURE 4 but showing a different form of item to be magnetized, and correspondingly different form of magnetizing heads;

FIGURE 6 is a diagram of the electrical circuit utilized in the apparatus; and

FIGURE 7 is a detail circuit diagram of an alternate form of control.

Referring now in detail to the drawings attention is directed first to FIGURE 1 showing an article 12 of the character to which the present invention is particularly adapted for magnetizing. The article 12 is a cup type unit utilized in generators and motors and includes an outer casing 14 having a cylindrical surrounding wall 16 and an end element 18. It also includes a pair of magnet members 20 secured to the cylindrical wall in a known manner. The magnet members are of known character being capable of being permanently magnetized for forming the intended magnets. They may be of solid material, or other material in which magnetizable material is imbedded. In the use of the unit 12 in a generator or motor, a rotor (not shown) is disposed in the space surrounded by the magnets and upon rotation thereof the usual function is performed. Generally the outer casing 14 is of metal and usually steel, and as such forms a high-flux path by-passing the magnets. For convenience, the members 20 will be referred to as magnets hereinafter, whether magnetized or not.

The present invention utilizes outside and inside magnetizing heads which cooperate in producing an intense flux path directly through the magnets, eliminating the objectionable by-pass path through the casing.

FIGURE 2 shows a physical structure in which the apparatus of the invention is incorporated, and includes a cabinet 22 which encloses the electrical circuit and various controls and instrumentalities having various control elements exposed to the exterior. The cabinet includes a top deck 24 having a station 26 in which units 12 are placed for the magnetizing operation, and may include for example a base element 28 for supporting the unit 12 and elements for locating the unit 12 in the desired position.

Attention is directed also to FIGURES 3 and 4 in conjunction with FIGURE 2 for the details of the station in which the unit 12 is placed, and the magnetizing heads. The magnetizing heads include an outer magnetizing head 30 having an iron core 32 which includes opposed and interfacing pole elements 34 and 36 disposed on opposite sides of the station 26. The magnetizing head 30 is energized by a coil 38 which appears in the circuit of FIGURE 6 at the lower left hand corner.

The apparatus also includes an inner magnetizing head 40 having a core 42, and opposed and outwardly directed pole elements 44 and 46 presented to and closely adjacent corresponding pole elements 34 and 36 of the outer magnetizing head, leaving spaces 48 therebetween which lie in a common circular path for receiving the surrounding wall element 16 of the unit 12 and the magnets 20 therein. The core 42 is energized by a coil 50 which also appears in the circuit of FIGURE 6 at the lower left hand corner.

The shape of the magnetizing heads is best shown in FIGURE 4 where it will be seen they correspond to the circular shape of the unit 12, i.e., the poles 34, 36 of the outer magnetizing head have concave faces 52 and 54 while the faces of the pole elements 44 and 46 on the inner magnetizing head are of convex shape. The pole faces are of substantial extent in arcuate direction nearly encompassing the magnets 20 in that direction. The space 48 preferably is narrow, sufficiently great to receive the unit 12 but having only sufficient play for practical consideration.

In the manufacture of the unit 12 it is desired that the material that is to make up the magnets 20 is originally unmagnetized, for facility in fabricating the unit and it is only after the unit is complete that the magnets 20 are magnetized. It is desired that the magnets 20 become magnetized throughout their entire area, or as nearly so as practicable, for greater efficiency in the operation of the generator in which it is to be incorporated. The shape and size of the pole elements of the magnetizing heads assure maximum magnetization of the magnets 20, so that upon operation of the rotor in the generator, the desired maximum generation of current is produced. It will be noted that the pole elements of the outside and inside magnetizing heads are mutually opposed as to polarity, establishing an intense and effective flux through the magnets 20 and the shapes of the pole faces are such that each element of each pole face is directly opposed to a corresponding element of the corresponding pole face.

FIGURE 5 shows a unit 60 which is similar to the unit 12 in general effect, but different in details of structure. The unit 60 includes an outer casing 62 which has a surrounding cylindrical wall 64 and an end element (not shown) to form a cup. Instead of the separate magnets 20 as in the previous case, the present unit 60 includes a magnetic element 66 which is made up of a body 68 of non-magnetic material, such as rubber serving as a carrier, and a plurality of small magnetic particles 70 embedded therein. The present device may be utilized in a motor of small capacity and strength and in keeping with the desired economy in the manufacture of the motor, the member 66 is made in the manner stated. This method of manufacture is extremely economical and the member may be mounted in the casing 62 by friction fit, for example.

For effective operation of the motor it is desired of course that only portions of the magnetic particles 70 be magnetized, such as at diametrically opposed areas. To this end the magnetizing heads 72, 74 corresponding to the magnetizing heads 30, 40 are of small dimensions circumferentially of the unit 60 so that the magnetization takes place in extremely limited areas as at 76, and indicated by the bounding dot-dash lines. The exact circumferential extent of the magnetized areas 76 is not critical and may vary over a wide range, but it is significant that these two areas are distinct and separated from each other and disposed on diametrically opposite sides of the unit. Therefore in the operation of the motor in which the unit is incorporated, the rotor and the two distinct magnetized areas produce the desired current.

Attention is now directed to the circuit diagram of FIGURE 6. A suitable AC source 78 leads to a first sub-circuit including an AC circuit 80 associated with the outer magnetizing head 30. This AC circuit includes a conductor 82 and a common return 84, another AC sub-circuit 86 associated with the inside magnetizing head and including a conductor 88 and the same common return 84. Also included are AC–SCR switching stages 90 and 92 connected in the conductors 82 and 88 and associated with respective magnetizing heads, these units being referred to again hereinbelow.

The AC circuit 80 leads to a rectifier 94 (bottom, left) which connects with a DC circuit 96 in which the coil 38 is incorporated. The AC circuit 86 leads through a reducing transformer 98 to a rectifier 100 in a DC circuit 102 which also includes the coil 50 of the inside magnetizing head. Preferably the voltage in the outside magnetizing head is substantially greater than that in the inside magnetizing head, such relation being for example 480 volts in the AC circuit 80; 400 volts in the DC circuit 96 and 25 volts in the DC circuit 102.

Connected in the main line are two control units 104 and 106 associated respectively with the stages 90, 92, and the unit 104 being also associated with a timer stage 108.

The switching stages 90 and 92 are substantially identical, and each has two parts including back-to-back solid state control elements in the form of silicon control rectifiers (SCCR's) or transistors 110 respectively operative for controlling the amount of current in opposite phases of the AC, these elements 110 being directly controlled by the control units 104 and 106 to pass the desired degree of current.

A transformer 112 has a primary 112p in the main line, and a secondary 112s in the unit 104. The secondary is in series with another transformer primary 114p of a transformer 114 which also includes a series of secondaries in the unit 90 as follows: 114s1, 114s2 associated with one of the SCR's 110 and other secondaries 114s3 and 114s4 associated with the other SCR 110.

Also connected across the secondary 112s in the unit 104 is another primary 116p in series with a potentiometer 118. The primary 116p is included in a transformer 116 which also includes secondaries 116s1 and 116s2 associated with respective ones of the SCR's 110 in the stage 90. Upon the setting of the potentiometer 118 at the desired point, the control exercised through the primary 116p is exerted through the secondaries 116s2 for controlling the SCR's 110 in that unit for allowing more or less current through the SCR's and correspondingly greater or less voltage build-up in the outside magnetizing head 30.

The operation of the control unit 106 on the switching stage 92 is similar to that just described in connection with the unit 104 and the switching stage 90 and a repetition of that description is unnecessary, but the various elements in these two components are identified with corresponding reference numerals as follows: transformers 120, 122, 124 and potentiometer 126.

The unit 106 also includes a primary 128p across the secondary 120s, this primary being associated with a secondary 128s1 (bottom, right) in the timer stage 108. The unit 104 includes a primary 130p in series with a potentiometer 132, together across the secondary 112s, this primary 130p being associated with a secondary 130s (bottom, right) in the timer stage 108.

A main charge or magnetizing switch 134 (center, right) is utilized for starting the magnetizing operation. The timer stage 108 includes a circuit 136 which includes a secondary 128s2 to the primary 128p in the unit 106. This circuit also includes a 2D21 tube 138 controlled by the secondaries 128s1 and 130s, the tube when conducting closing circuit through a relay 139 having a coil 139a in series with the tube and contacts 139b, 139c, 139d, 139e and 139f in the various circuit portions. The potentiometers 118, 126 and 132 are connected together in gang for conjoint operation. A suitable adjusting means 140 is provided in the timer stage 108 for controlling the tube 138 and shutting it off and thus terminating the magnetizing period. The tube circuit includes capacitors 142 and 144 operative according to their inherent characteristics for shutting off the tube pursuant to a predetermined time interval. The arrangement encompasses means for shutting off according to current control, as illustrated in FIGURE 7, where the conductors 146 and 148 are connected at points 146' and 148' in the circuit of FIGURE 6 (bottom, right), and a secondary 130s2 is provided in the transformer 130, the current therefrom being imposed on the grid of the tube 138.

While I have disclosed herein a certain preferred form of the invention it will be understood that changes may be made therein within the spirit and scope of the appended claims.

I claim:

1. Apparatus of the character disclosed for use with a device having a portion including spaced elements capable of being magnetized, and including a mounting station for receiving the device, comprising a first magnetizing head having pole elements on opposite sides of the station for magnetizing association with respective ones of said spaced elements, and a second magnetizing head in the center of said station and having pole elements respectively of opposite polarity to and directed to the pole elements of the first magnetizing head and positioned for receiving said spaced elements of the device in spaces therebetween, and means for impressing magnetizing current in said magnetizing heads.

2. The apparatus set out in claim 1 wherein said means for impressing magnetizing current is operative for impressing DC current in the magnetizing heads.

3. The apparatus set out in claim 2 and including a source of AC and means for converting the AC to DC and impressing it in the magnetizing heads.

4. The apparatus set out in claim 3 wherein the means for impressing DC in the magnetizing heads is operative for developing substantially greater voltage in the first magnetizing head than in the second.

5. The apparatus set out in claim 1 and including circuit means, manually operated means for energizing the circuit means and thereby impressing magnetizing current in the magnetizing heads, and holding means is provided for retaining the circuit means in energized condition pursuant to an original impulse in manually energizing it, and means responsive to a predetermined condition for de-energizing the circuit means independently of said manually controlled means, said de-energizing means also being operative for de-energizing said manually operable energizing means.

6. The apparatus set out in claim 5 wherein said means for de-energizing the circuit means is operative for measuring current and operative for so de-energizing the circuit means pursuant to a pre-determined quantity of current flow.

7. The apparatus set out in claim 5 wherein said means for de-energizing the circuit means is operative for so de-energizing it pursuant to the passage of a pre-determined time interval.

8. The apparatus set out in claim 1 and including circuit means adapted for connection with an AC source, said circuit means including a sub-circuit for each magnetizing head, each sub-circuit including a switching stage having back-to-back solid state control elements, and each sub-circuit including rectifying means and a DC circuit which includes the respective magnetizing head whereby the current impressed on the magnetizing heads is DC.

9. Apparatus according to claim 8 wherein the solid state control elements are transistors each capable of controlling the amount of current passing therethrough in each respective half cycle of the AC, thereby controlling the amount of DC impressed in the magnetizing heads.

10. Apparatus according to claim 1 adapted for connection with an AC source, and including means for converting AC to DC and impressing the DC on the magnetizing heads, said magnetizing heads having respective pole elements of opposite polarity in adjacent ones of the different heads whereby a continuous and intense inductance path is established through the successive pole elements and thereby through devices interposed in said spaces between adjacent pole elements.

11. Apparatus according to claim 10 having a station with a circular outline which includes said spaces between adjacent pole elements, and the magnetizing heads are of such width and the pole elements have opposed pole faces of such arcuate extent such as to encompass a substantial portion of said circular outline and thereby encompass a corresponding portion of an item to be magnetized of the shape of that outline and disposed therein.

12. Apparatus according to claim 10 having a station with a circular outline which includes said spaces between adjacent separated pole elements, and the magnetizing heads are of such width and the pole elements have interfacing pole faces of such arcuate extent such as to encompass a substantial portion of said circular outline and thereby encompass a corresponding portion of an item to be magnetized of the shape of that outline and disposed therein, said apparatus being adapted for use with items to be magnetized having a magnetizable member extending entirely circumferentially thereof, and the magnetizing heads and pole elements thereof are of small circumferential extent relative to said circular path whereby the magnetizing heads magnetize relative small areas of said magnetizable member and said areas are at substantially diametrically opposed positions.

13. A method of magnetizing a member having spaced portions oppositely disposed relative to an open center, said member capable of being magnetized, the steps comprising; providing inner magnetizing means adapted to be placed within said open center, providing outer magnetizing means adapted to be placed outside said member, said outer magnetizing means having poles opposite to and directed towards the poles of said inner magnetizing means, said inner and outer magnetizing means forming gaps between opposed poles, inserting said portions of said member within said gaps, and impressing a magnetizing force in the magnetizing means.

14. A method according to claim 13 in conjunction with magnetizing such member in which the portions extend circumferentially and selectively magnetizing only segments of the portions in opposite diametrically opposed positions, and less than the full circumferential extent of the portions.

15. A method according to claim 13 in conjunction with magnetizing such member in which the portions extend circumferentially, whereby the portions are magnetized throughout their circumference.

References Cited

UNITED STATES PATENTS

| 2,248,272 | 7/1941 | Jurak | 335—284 |
| 3,249,825 | 5/1966 | Cohen | 335—284 |
| 3,335,377 | 8/1967 | Kohlhagen | 335—284 |

FOREIGN PATENTS

| 179,422 | 1/1954 | Austria. |

LEE T. HIX, *Primary Examiner.*

J. A. SILVERMAN, *Assistant Examiner.*

U.S. Cl. X.R.

335—284